Patented Oct. 9, 1951

2,570,822

UNITED STATES PATENT OFFICE 2,570,822

ANION EXCHANGE MATERIALS AND THEIR PREPARATION

Theodore R. E. Kressman, Twickenham, England, assignor to The Permutit Company, New York, N. Y., a corporation of Delaware No Drawing. Application August 10, 1948, Serial No. 43,550. In Great Britain August 14, 1947

10 Claims. (Cl. 260—65)

This invention relates to organic resinous materials for removing anions from solution, and more particularly to such materials that are capable of removing from solutions not only the anions of strong acids but also the anions of weak acids, such as carbonates and silica.

Certain relatively insoluble synthetic resins have been found to have the property of removing anions from solutions and are generally termed "anion exchange resins" or materials. These resins, although relatively insoluble, react chemically with the substance in the solution treated to remove the anions of the substance, and after a certain period of use may be regenerated with an alkaline solution to restore their anion removing properties.

Most anion exchangers are effective for removal of the anions of strong acids such as hydrochloric, sulfuric and nitric acids, but either are not effective at all or only slightly effective for removal of the anions of very weak acids, such as carbonic and silicic acids.

An object of my invention is the provision of a new anion exchange resin or material which is insoluble in water and capable of acting as an anion exchanger to remove effectively carbonates and silica from solutions as well as the anions of strong acids.

A further object of my invention is the provision of methods of preparing and utilizing such anion exchange resins.

I have discovered that a new and highly advantageous anion exchange material can be produced by the treatment of an organic or resinous material which contains secondary amino groups with an alpha:beta unsaturated aldehyde or ketone and with an aliphatic halogen compound. The material thus produced can be made in a form that is virtually insoluble in water or dilute solutions of acids and bases, has a considerably increased basicity compared with conventional anion exchangers and exhibits the property of removing not only the anions of strong acids from solutions but also the anions of weak acids from solutions containing them.

While I do not wish to be limited by any particular theory of reaction or operation, it is my belief that the reaction of the unsaturated aldehyde or ketone with the organic or resinous material containing secondary amino groups converts these groups into tertiary amino groups and that they are then in turn converted to quaternary ammonium groups by reaction with the aliphatic halogen compound. At the same time, I believe that cross linkages are introduced into the resin by the reaction of the organic or resinous material with the unsaturated aldehyde or ketone. If the aliphatic halide is a poly-halogen compound, still further cross linkages may be produced in the resin itself with a corresponding increase in mechanical strength of the final product.

Various organic amines or materials containing amino groups may be employed as a starting material, such as polyethylene polyamine, tetra-ethylene-pentamine, and even simple amines such as diethyl amine. If the amino product used as a starting material contains only primary amino groups, it may first be reacted with an aldehyde to convert these primary groups to secondary amino groups. I prefer to use as a starting material a resin or resin intermediate that contains the necessary secondary amino groups.

While various alpha:beta unsaturated aldehydes or ketones may be employed, I have found that acrolein, croton-aldehyde and the mono- or di-vinyl ketones are satisfactory.

The aliphatic halide may be a mono- or a poly-halide and may be used as a solvent for the other reaction components, or all of the reactants may be dissolved in a common solvent, or, as understood by those familiar with the resin art, the process may be carried out in the absence of a solvent or with the reacting material in the form of a suitable suspension or emulsion in an immiscible liquid such as water. It is preferable to use an aliphatic poly-halide e. g. methylene dichloride, ethylene dichloride, propylene dichloride.

The reaction conditions may be widely varied. For example, the reaction can be carried out by heating in an alkaline, acid or neutral solution. Also, it may be carried out at atmospheric pressure or at an elevated pressure as by the use of an autoclave.

While a resin or resin intermediate containing secondary amino groups is preferred as a starting material, I have also found that a non-resinous secondary amine such as diethylamine may be used as the starting material and reacted with the unsaturated aldehyde or ketone and with an aliphatic poly-halide to produce an acceptable anion exchange resin. In this case, however, it is usually desirable, or necessary, to include as an additional reagent a material which reacts with the aldehyde to serve as a hardening agent. Materials such as phenol, melamine, urea, aniline, acetone and the like, or their intermediate condensation products with aldehydes may be used for this purpose.

Regardless of how the final resinous anion exchange material is produced, it is reacted until a gel is formed, which is then isolated, dried and granulated.

In order that the preparation and use of the anion exchangers of my invention may be more clearly understood, the following examples are given. All proportions given are by weight unless otherwise specified.

*Example I.*—250 grams of crude moist polyethylene polyamine obtained by reacting ethylene dichloride with ammonia under pressure, adding an excess of caustic soda and then separating the oily base, was mixed with 500 cc. of ethylene dichloride and while the mixture was being stirred 50 grams of paraformaldehyde was added. This produced a material in the form of a thick liquid which contained long chain secondary amines. To this material was added 270 cc. of crotonaldehyde which caused the formation of a dark brown gel, appearing at first to separate from the ethylene dichloride. However, after standing for about 15 minutes the gel absorbed the ethylene dichloride and at the same time became very soft. The product was then heated under reflux when it liquefied and was gradually converted during a heating period of one and one-half hours into a dark brown firm resin gel. This gel was then dried at 125° C. to produce a very hard water insoluble resin which was granulated to a size of about 20–40 mesh, soaked in water, and placed in a column for the treatment of solutions.

Upon treatment with twice its volume of a 5% sodium carbonate solution, it was found this material had a capacity of 10 kgr./cu. ft., calculated as $CaCO_3$, for removal of mineral acid from water.

A column of the exchange material was also treated or regenerated with twice its volume of 2% sodium hydroxide solution and the excess alkali washed out with water. The resin was then used to treat water from which all the salts of mineral acids had been removed by ion-exchange, but which still contained 60 P. P. M. of $CO_2$ and 7 P. P. M. of silica. Both the $CO_2$ and silica were removed by my new anion exchanger and it was found that 1 kgr./cu. ft. of silica as $SiO_2$ had been taken up by the anion exchange resin before silica appeared in the effluent. The resin, however, continued to remove $CO_2$ from the water and removed 9 kgr./cu. ft. (expressed as $CaCO_3$) before $CO_2$ appeared in the effluent.

*Example II.*—120 grams of dicyandiamide was warmed with 160 grams of dimethyl sulfate and the pale semi-solid product thus obtained was dissolved in 1 liter of water. 540 grams of the crude moist polyethylene polyamine, obtained as described in Example I was then added, followed by 750 cc. of 40% formalin, 1 liter of ethylene dichloride and 750 cc. of crotonaldehyde.

When this mixture was heated on a water bath under reflux, a soft gel was formed which became harder after 5 hours. The product was then dried at 130° C., granulated, further dried and tested as in Example 1.

The capacity of this product, when regenerated with sodium carbonate, for removal of mineral acid from dilute solution was found to be 14 kgr./cu. ft., and when regenerated with caustic soda, its capacity for removal of silica was 1.25 kgr./cu. ft.

*Example III.*—250 grams of crude polyethylene polyamine prepared as in Example I was mixed with 250 cc. of water and 250 cc. of 40% formalin. The temperature rose spontaneously to 50° C. 700 cc. of ethylene dichloride was then added followed by 450 cc. (390 grams) of crotonaldehyde which produced a further rise in temperature to 60° C. and formation in about 5 minutes of a thin yellow resin. This was heated in an autoclave for 4 hours at 140°–160° C. with a maximum pressure of 125 lbs./in.$^2$, then removed, dried at 125° C. and granulated. The hard brown resin thus obtained was tested as in Example I and found to have capacities for removing mineral acid and silica from water of 13 and 1.25 kgr./cu. ft., respectively.

*Example IV.*—450 grams of pure tetraethylene pentamine was dissolved in a mixture of 320 cc. concentrated nitric acid and 3 liters of water. 210 grams of dicyandiamide was then added, and the whole evaporated to dryness and heated at 160° C. for 3 hours. This product, containing both primary and secondary amino groups, was dissolved in a liter of water and 500 cc. of 40% formalin was added followed by 750 cc. of ethylene dichloride and 600 cc. of crotonaldehyde.

The mixture was then reacted by heating on a water bath under reflux for 1 hour when a gel formed. The gel was removed, dried at 125° C. and granulated. When this product was tested as in Example I, its capacities for removing mineral acid and silica from water were found to be 18 and 1.75 kgr./cu. ft., respectively.

*Example V.*—A resin was prepared following the procedure of Example III except that 470 grams of ethyl vinyl ketone was substituted for the 390 grams of crotonaldehyde. A very similar product was obtained having capacities for removing mineral acid and silica of 12 and 1 kgr./cu. ft., respectively.

*Example VI.*—1 liter of diethylamine was mixed with 500 cc. of crotonaldehyde and allowed to stand at room temperature over night. The product was mixed with 800 cc. of ethylene dichloride and warmed under reflux for 1 hour. Meanwhile, 720 cc. of acetone, 1.2 liters of 40% formalin and 400 cc. of 20% caustic soda were separately mixed and warmed. The two mixtures were then mixed together and heated on a water bath under reflux for about 3 hours. The gel formed was removed, dried at 125° C. and granulated to give a hard light colored resin which was tested as in Example I. It was found to have mineral acid and silica removing capacities of 12 and 1 kgr./ cu. ft., respectively.

The reaction conditions may be varied. For example, the reaction in Example III is carried out under alkaline conditions but a similar product is obtained if the mixture is acidified just before it is put into the autoclave. Also, this reaction may be carried out at atmospheric pressure instead of in the autoclave.

The anion exchangers of my invention may be employed in a conventional manner and regenerated as needed with an alkaline solution. However, to utilize them effectively for the removal of anions of weak acids such as acids having a dissociation constant of not more than $10^{-5}$, it is necessary to regenerate the exchange materials with a solution of a strong alkali such as caustic soda or the like. Milder alkaline materials such as sodium carbonate are suitable for regeneration when only strong acids such as hydrochloric or sulfuric are to be removed, but if the product is to be used to remove weak acids such as carbonic, silicic or weakly dissociated materials such as phenol from solution, the stronger alkali should be used for regeneration.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. An anion exchange material which comprises a water insoluble resin formed by the heat reaction of a polyalkylene polyamine with formaldehyde, an alkylene polyhalide and a compound selected from the group consisting of alpha:beta unsaturated aldehydes and alpha:beta unsaturated ketones.

2. An anion exchange material which comprises a water insoluble resin formed by the heat reaction of a polyalkylene polyamine with formaldehyde, ethylene dichloride and a compound selected from the group consisting of alpha:beta unsaturated aldehydes and alpha:beta unsaturated ketones.

3. An anion exchange material which comprises a water insoluble resin formed by the heat reaction of a polyalkylene polyamine with formaldehyde, an alkylene polyhalide and crotonaldehyde.

4. An anion exchange material which comprises a water insoluble resin formed by the heat reaction of a polyalkylene polyamine with formaldehyde, an alkylene polyhalide and ethyl vinyl ketone.

5. An anion exchange material which comprises a granular water insoluble resin formed by the heat reaction of a polyalkylene polyamine with formaldehyde, an alkylene polyhalide and a compound selected from the group consisting of alpha:beta unsaturated aldehydes and alpha:beta unsaturated ketones, and treating the water insoluble resin with a solution of caustic soda.

6. A method of preparing an anion exchange resin which comprises reacting by heat a polyalkylene polyamine with formaldehyde, an alkylene polyhalide and a compound selected from the group consisting of alpha:beta unsaturated aldehydes and alpha:beta unsaturated ketones to form a gel, and drying the gel at an elevated temperature.

7. A method of preparing an anion exchange resin which comprises reacting by heat a polyalkylene polyamine with formaldehyde, an alkylene polyhalide and a compound selected from the group consisting of alpha:beta unsaturated aldehydes and alpha:beta unsaturated ketones to form a gel, drying the gel at an elevated temperature, granulating the product thus obtained, and treating it with a caustic soda solution.

8. A method of preparing an anion exchange resin which comprises reacting by heat a polyalkylene polyamine with formaldehyde, ethylene dichloride and a compound selected from the group consisting of alpha:beta unsaturated aldehydes and alpha:beta unsaturated ketones to form a gel, and drying the gel at an elevated temperature.

9. A method of preparing an anion exchange resin which comprises reacting by heat a polyalkylene polyamine with formaldehyde, an alkylene polyhalide and crotonaldehyde to form a gel, and drying the gel at an elevated temperature.

10. A method of preparing an anion exchange resin which comprises reacting by heat a polyalkylene polyamine with formaldehyde, an alkylene polyhalide and ethyl vinyl ketone to form a gel, and drying the gel at an elevated temperature.

THEODORE R. E. KRESSMAN.

REFERENCES CITED

The following references are of record in the file of this patent:

UNITED STATES PATENTS

| Number | Name | Date |
| --- | --- | --- |
| 2,228,514 | Griessbach et al. | Jan. 14, 1941 |
| 2,352,387 | Hopff et al. | June 27, 1944 |
| 2,442,989 | Sussman | June 8, 1948 |
| 2,456,428 | Parker | Dec. 14, 1948 |
| 2,481,768 | Mills | Sept. 13, 1949 |

FOREIGN PATENTS

| Number | Country | Date |
| --- | --- | --- |
| 489,173 | Great Britain | July 20, 1938 |

OTHER REFERENCES

Myers et al., Ind. and Eng. Chem., vol. 33, 1941, pp. 697 to 700 and 706.